US008398026B2

(12) United States Patent
Walton et al.

(10) Patent No.: US 8,398,026 B2
(45) Date of Patent: Mar. 19, 2013

(54) MULTI-FUNCTION ROTARY ACCESS DOOR

(75) Inventors: Jennifer Marie Walton, O'Fallon, MO (US); Timothy Mark Garrett, St. Louis, MO (US); James Vincent Eveker, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 926 days.

(21) Appl. No.: 12/331,881

(22) Filed: Dec. 10, 2008

(65) Prior Publication Data

US 2010/0140406 A1 Jun. 10, 2010

(51) Int. Cl.
*B64C 1/14* (2006.01)

(52) U.S. Cl. .............. 244/129.5; 244/102 R; 244/137.1; 49/40; 49/41; 296/155

(58) Field of Classification Search ............... 244/129.4, 244/129.5, 100 R, 102 R, 137.1; 49/40, 41, 49/254, 257, 258, 259, 260, 261; 296/155; 105/332, 341, 343, 348, 377.01; 114/116, 114/117, 118, 119, 120, 201 R, 202, 320
See application file for complete search history.

(56) References Cited

U.S. PATENT DOCUMENTS

| | | | |
|---|---|---|---|
| 2,457,625 A * | 12/1948 | Amiot ........................ 244/129.5 |
| 2,634,656 A | 4/1953 | Woollens et al. | |
| 2,651,541 A * | 9/1953 | Surles ........................... 296/155 |
| 2,921,501 A * | 1/1960 | Parot ............................... 89/1.51 |
| 2,937,573 A | 5/1960 | Gantschnigg | |
| 2,947,533 A * | 8/1960 | Brumby et al. ................. 49/253 |
| 2,949,060 A | 8/1960 | Gantschnigg et al. | |
| 3,765,626 A * | 10/1973 | Maynard et al. ........... 244/129.5 |
| 4,510,714 A | 4/1985 | Kasper et al. | |
| 4,801,172 A * | 1/1989 | Townsend ..................... 296/155 |
| 4,930,398 A | 6/1990 | Sharples | |
| 5,257,758 A * | 11/1993 | Hassel ........................ 244/137.4 |
| 5,259,576 A * | 11/1993 | Howard ..................... 244/129.5 |
| 5,378,036 A * | 1/1995 | Townsend ..................... 296/155 |
| 5,803,405 A | 9/1998 | Ellis et al. | |
| 6,098,925 A | 8/2000 | Burdsall, II et al. | |
| 6,352,221 B1 | 3/2002 | Sakurai | |
| 6,536,711 B1 | 3/2003 | Conway, Jr. et al. | |
| 6,663,047 B1 | 12/2003 | Arata | |
| 6,925,756 B2 * | 8/2005 | Roessner et al. ................. 49/42 |
| 7,249,737 B2 * | 7/2007 | Simmons et al. .......... 244/129.5 |
| 7,594,556 B1 * | 9/2009 | Panzarella et al. ............ 180/169 |
| 2002/0175245 A1 * | 11/2002 | Sheremeta ................. 244/118.5 |
| 2003/0146347 A1 * | 8/2003 | Roessner et al. ........... 244/129.5 |
| 2008/0277529 A1 * | 11/2008 | Marche ...................... 244/129.4 |

* cited by examiner

*Primary Examiner* — Robert Canfield
*Assistant Examiner* — Jessie Fonseca
(74) *Attorney, Agent, or Firm* — Yee & Associates, P.C.

(57) ABSTRACT

A method and apparatus comprising a frame and a door. The door may be moveably connected to the frame. The door may be capable of being rotated in the frame between a closed position and an open position to provide access to an opening of a vehicle body without moving the door outside of a mold line of the vehicle body.

12 Claims, 12 Drawing Sheets

MULTI-FUNCTION ROTARY ACCESS DOOR

BACKGROUND INFORMATION

1. Field

The present disclosure relates generally to aircraft and, in particular, to a method and apparatus for providing access to an aircraft. Still more particularly, the present disclosure provides a method and apparatus for providing access to an aircraft using a door.

2. Background

An aircraft door may provide access to an interior of an aircraft. A door for an aircraft may typically have an outer skin that may conform to the surrounding outside mold line of the body of the aircraft. The outer surface of the aircraft door may form a substantially uninterrupted surface during flight which may not produce additional drag while sealing the door opening of the fuselage of the aircraft.

In some cases, an aircraft door may be opened during flight for various operations. These operations may include, for example, without limitation, deploying landing gear, deploying weapons, opening auxiliary air intakes, deploying cargo, and/or other suitable operations. These types of operations may increase the load on the door. As a result, hinges and/or other mounting components for the door may be required to withstand these types of operating loads. Additionally, currently used doors may open outward in a manner that may increase the drag on the aircraft.

Current door systems that may be used during flight may employ goose-neck hinged doors that may rotate outward into the airstream. These types of doors may include, for example, without limitation, weapons bay doors, landing gear doors, and/or some other suitable types of doors. These types of designs may employ spoilers to provide acoustic reduction and improved flow in the interior of the aircraft. Further, some door designs may include a bi-fold door and clam-shell door assembly.

These currently used door systems may be subjected to high loading, flutter, fatigue, increased drag, and shock generation during supersonic weapons release because they may extend outside of the mold line of the vehicle body. Further, these types of aircraft doors also may have complex heavy hinges. These complex hinges may experience high amounts of stress and wear on aerodynamic edge seals.

By opening hinged doors outside of the outer mold line and into the airstream during flight, the radar cross-section of the vehicle may increase as well as acoustic levels within at least the bay of the aircraft. Also, with the complexity of these doors, the amount of maintenance needed for the doors may take the aircraft out of service for periods longer than desired. Additionally, the complexity and weight of the doors and hinges also may add to the weight of the aircraft, which may be undesirable.

Therefore, it would be advantageous to have a method and apparatus that takes into account one or more of the issues described above.

SUMMARY

In one advantageous embodiment, an apparatus may comprise a frame and a door. The door may be moveably connected to the frame. The door may be capable of being moved in the frame between a closed position and an open position to provide access to an opening of a vehicle body without moving the door outside of a mold line of the vehicle body.

In another advantageous embodiment, a door for an aircraft may comprise a vehicle body having an opening, a frame, a door, a door movement system, and a plurality of wheels. The door may be moveably connected to the frame and capable of being rotated in the frame between a closed position and an open position to provide access to the opening of the vehicle body without moving the door outside of a mold line of the vehicle body. The door movement system may be capable of rotating the door to provide the access to the opening without moving the door outside of the mold line of the vehicle body. The door movement system may be capable of translating the door inward from a first position to a second position into the vehicle body and rotating the door in the second position to provide access to the opening without moving the door outside of the mold line of the vehicle body. The door movement system may be capable of translating the door from the second position to the first position after the door has been rotated to provide access to the opening. The door movement system may comprise a motor, a gear system connected to the motor and the door, and a door translation system. The motor may be capable of rotating the door and a gear system. The gear system may be capable of rotating the door in the frame in response to operating the motor. The door translation system may be a linear actuator system and may be capable of translating the door inward from the first position to the second position into the vehicle body. The door may comprise a cylindrical structure that may have an opening capable of providing access to the interior of the vehicle when rotated to the open position from the closed position and a track system on the cylindrical structure moveably connected to the frame. The plurality of wheels may be attached to the frame. The plurality of wheels may engage the track system for the cylindrical structure moveably connected to the frame. The motor may be capable of rotating a wheel within the plurality of wheels to rotate the cylindrical structure between the open position and the closed position. The vehicle body may be for a vehicle selected from one of a mobile platform, an aircraft, a surface ship, a tank, a personnel carrier, a train, a spacecraft, a submarine, and a bus.

In yet another advantageous embodiment, a method may be present for moving a door. The door may be translated inward from a first position to a second position into a vehicle body. The door may be rotated in the second position to an open position to provide access to an opening in the vehicle body, wherein rotating the door may be performed without moving the door outside of a mold line of the vehicle body. The door may be translated from the second position to the first position.

In a further advantageous embodiment, a method may be present for moving a door in an aircraft. The door may be translated inward from a first position to a second position into a vehicle body. The door may be rotated in the second position to an open position to provide access to an opening in the vehicle body, wherein rotating the door may be performed without moving the door outside of a mold line of the vehicle body. The door may be translated from the second position to the first position. A number of operations may be performed with the door in the first position and in the open position. The door may be translated inward from the first position to the second position into the vehicle body with the door in the open position. The door may be rotated to a closed position to prevent access to the opening in the vehicle body, wherein rotating the door may be performed without moving the door outside of the mold line of the vehicle body. The door may be translated in the closed position from the second position to the first position.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
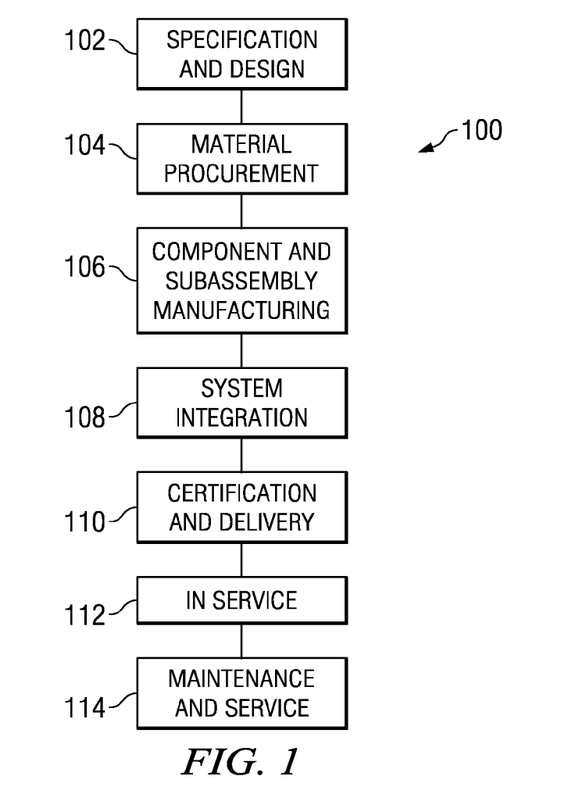
FIG. 1 is a diagram illustrating an aircraft manufacturing and service method in accordance with an advantageous embodiment.
Figure 2:
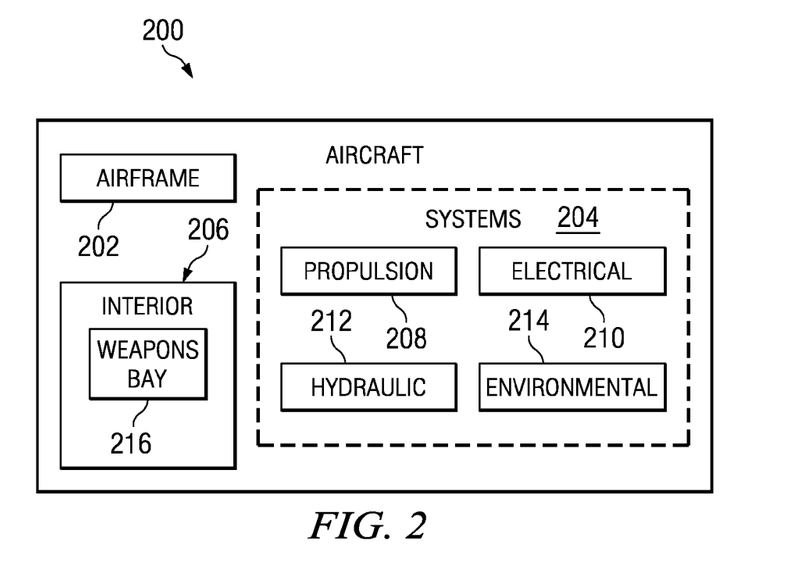
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214.

In these examples, aircraft 200 also may include weapons bay 216 within interior 206. Different advantageous embodiments may be implemented within weapons bay 216. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, the advantageous embodiments may be employed during one or more of component and subassembly manufacturing 106, system integration 108, and/or maintenance and service 114 to implement a door environment in accordance with an advantageous embodiment.

The different advantageous embodiments recognize and take into account that hinged doors opening outward from an outer mold line of a vehicle may have higher stresses and/or loads that may occur when the doors are opened during flight. Further, the different advantageous embodiments recognize and take into account that currently used doors may have faying surfaces that may experience undesirable wear over time, a reduction in the service life of parts for the door, increased noise, and/or increased drag. The different advantageous embodiments also recognize that the complex door systems currently used in aircraft also may increase the weight of the aircraft.

Thus, the advantageous embodiments provide a method and apparatus for a door system. A frame is present that may be capable of holding the door. The door may be capable of being moved between a closed position and an open position to provide access to an opening of a vehicle body without moving the door outside of the outer mold line of the vehicle body.

Figure 3:
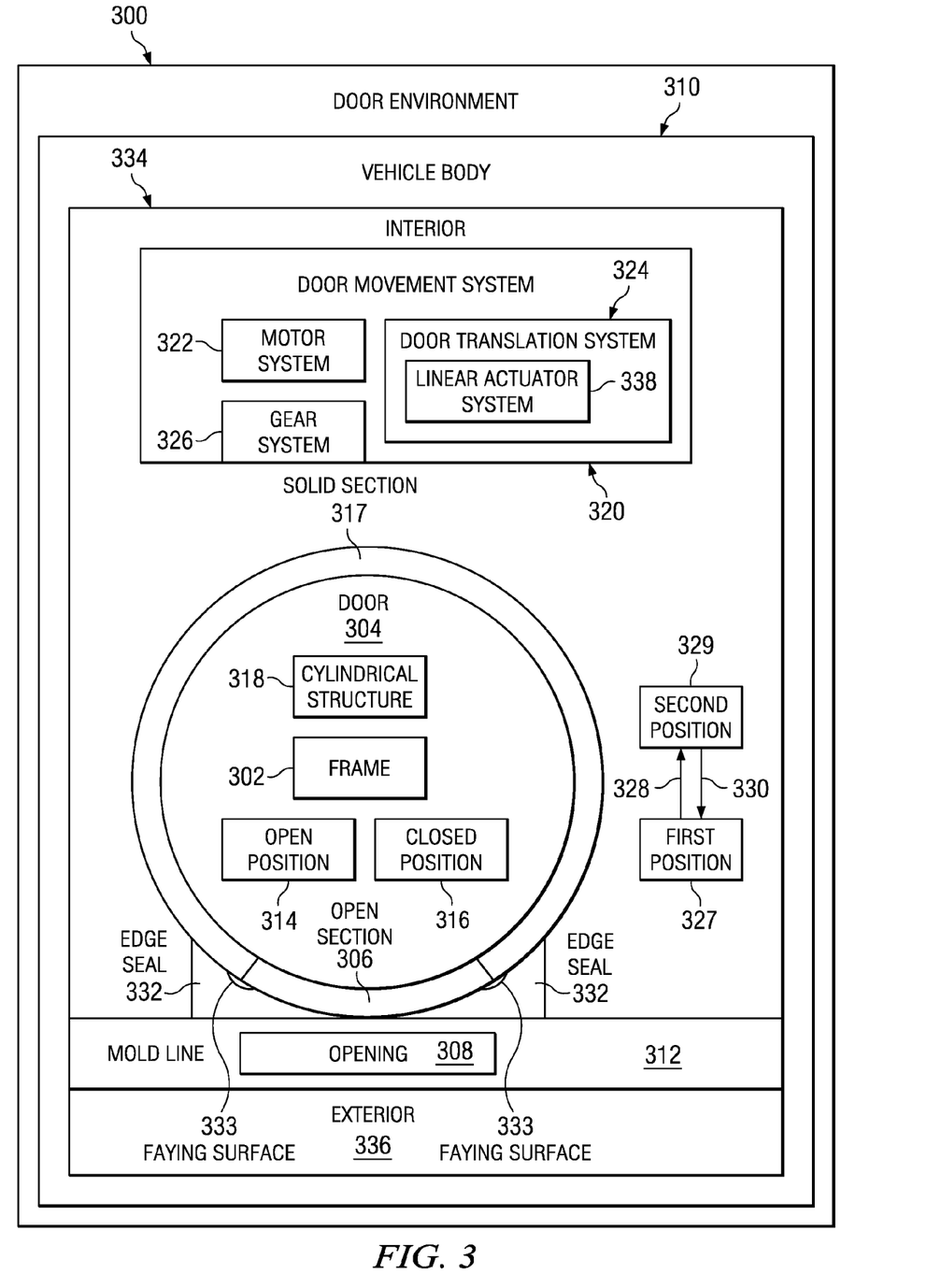
FIG. 3 is a diagram of a door environment in accordance with an advantageous embodiment.

With reference now to FIG. 3, a diagram of a door environment is depicted in accordance with an advantageous embodiment. In this example, door environment 300 may have door 304 with open section 306. Open section 306 may coincide with opening 308 in vehicle body 310. Vehicle body 310 has mold line 312. Open section 306 may coincide with opening 308 when door 304 is in open position 314.

In other words, when open section 306 and opening 308 coincide with each other, access to vehicle body 310 through opening 308 may occur. Solid section 317 may coincide with opening 308 when door 304 is in closed position 316. This position may prevent access to vehicle body 310 through opening 308. Door 304 may move between open position 314 and closed position 316 without moving door 304 outside of mold line 312. Door 304 may take the form of cylindrical structure 318 in these illustrative examples. In these examples, the movement of door 304 may be, without limitation, a rotation or rotating movement.

Door 304 may be moved by door movement system 320. Door movement system 320 may have motor system 322, door translation system 324, and gear system 326. In these illustrative examples, motor system 322 may include a number of motors. A number of items, as used herein, refers to one or more items. For example, a number of motors may be one or more motors. Motor system 322 may rotate door 304 through gear system 326, which may engage door 304.

Door translation system 324 may move door 304 inward in vehicle body 310 as illustrated by arrow 328. Door translation system 324 also may move door 304 outward as shown by arrow 330 between first position 327 and second position 329. Translation of door 304 inward in the direction of arrow 328 from first position 327 to second position 329 may be performed before rotating door 304. This translation may move door 304 away from edge seal 332 in vehicle body 310.

Edge seal 332 may seal interior 334 of vehicle body 310 from exterior 336 when in closed position 316. This may allow pressurization of interior 334 of vehicle body 310 and/or reduce drag on vehicle body 310. Movement of door 304 in the direction of arrow 328 away from edge seal 332 before rotation of door 304 may reduce wear on edge seal 332. In other words, door 304 may reduce and/or eliminate faying and/or impingement of surface 333 on edge seal 332. By eliminating faying of surface 333 on edge seal 332, wear on surface 333 may be reduced and/or eliminated.

After door 304 has been moved to one of open position 314 and closed position 316, door translation system 324 may move door 304 back towards exterior 336 in the direction of arrow 330. In these examples, door translation system 324 may be, for example, without limitation, linear actuator system 338.

The illustration of door environment 300 in FIG. 3 is not meant to imply physical or architectural limitations to the manner in which different advantageous embodiments may be implemented. Different advantageous embodiments may have other components in addition to, or in place of, the ones illustrated. Further, in some advantageous embodiments, some of the components illustrated for door environment 300 may be unnecessary.

For example, depending on the particular implementation, door translation system 324 may be unnecessary. Instead, door 304 may rotate between open position 314 and closed position 316 against edge seal 332. In other advantageous embodiments, edge seal 332 may retract or move out of the way of door 304 during rotation of door 304.

In still other advantageous embodiments, door 304 may have additional openings in addition to opening 308. These additional openings may have different sizes depending on the type of access needed through opening 308.

Figure 4:
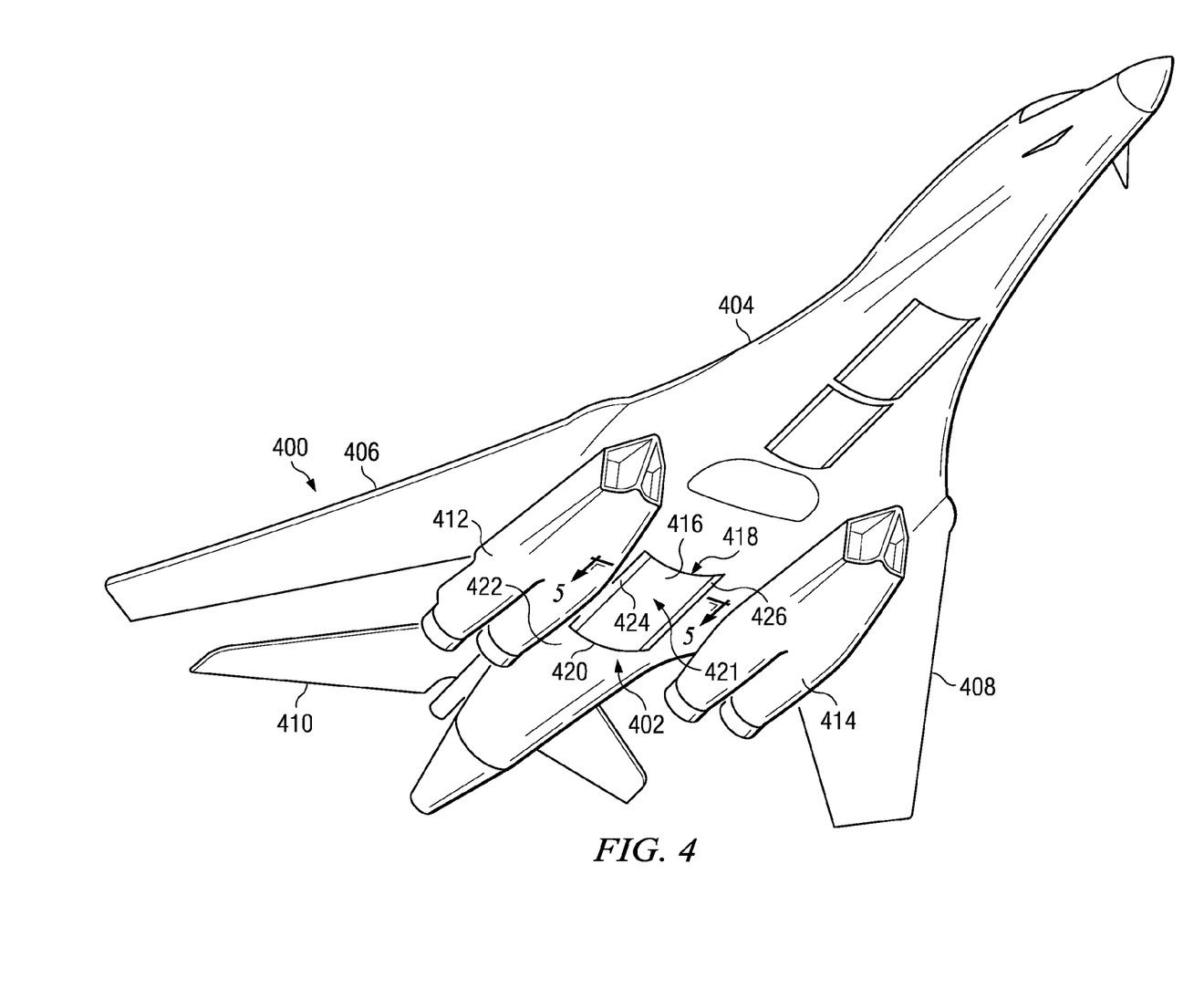
FIG. 4 is a diagram of an aircraft in accordance with an advantageous embodiment.

With reference now to FIG. 4, a diagram of an aircraft is depicted in accordance with an advantageous embodiment. In this example, aircraft 400 may be an example of one implementation for aircraft 200 in FIG. 2. Aircraft 400 may implement door environment 402.

Aircraft 400 may include vehicle body 404. Wing 406, wing 408, and tail 410 may be attached to and/or integrated with vehicle body 404. Aircraft 400 also may have engine 412 and engine 414 attached to vehicle body 404. In this illustrative example, door 416 may cover opening 418 in mold line 420 of vehicle body 404 for weapons bay 421. Mold line 420 may be the shape and/or contour of surface 422 of a body such as, for example, vehicle body 404. In these different advantageous embodiments, door 416 may be operated without having door 416 moving outside of mold line 420 of vehicle body 404. Edge seal 424 and edge seal 426 may be located around opening 418.

Figure 5:
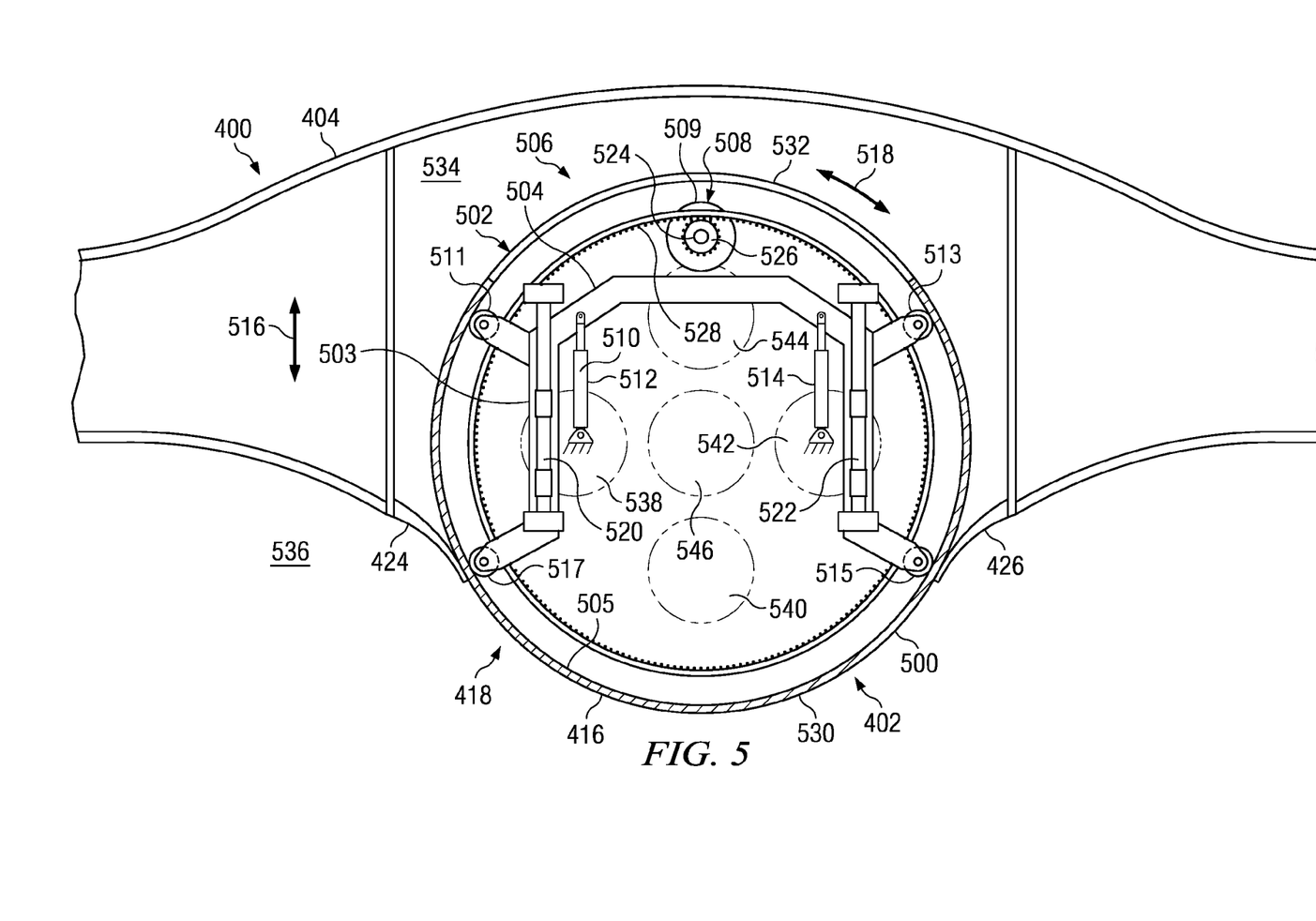
FIG. 5 is a diagram of a cross-sectional view of a door environment in an aircraft in accordance with an advantageous embodiment.

With reference now to FIG. 5, a diagram of a cross-sectional view of a door environment in an aircraft is depicted in accordance with an advantageous embodiment. In this illustrative example, a cross-sectional view of a portion of vehicle body 404 for aircraft 400 is depicted taken along lines 5-5 in FIG. 4.

In this illustrative example, door 416 may take the form of cylindrical structure 500. Cylindrical structure 500, substantially a cylindrical shape, may have track system 502, which may engage holding structure 503 for frame 504. Track 505 in track system 502 may engage wheels 511, 513, 515, and 517 on holding structure 503. Cylindrical structure 500 may be rotatably attached to track system 502. Cylindrical structure 500 may be movable using door movement system 506. In this example, door movement system 506 may include motor system 508 and door translation system 510. In this illustrative example, door translation system 510 may include linear actuator 512 and linear actuator 514. Door translation system 510 may move cylindrical structure 500 in the direction of arrow 516. Motor system 508 may include motor 509 and may move cylindrical structure 500 in the direction of arrow 518.

In these examples, holding structure 503 in frame 504 may be attached to slide 520 and/or slide 522 in a manner that may allow cylindrical structure 500 to move in the direction of arrow 516 in response to movement by door translation system 510. Motor 509 in motor system 508 may rotate cylindrical structure 500 through gear system 524, which may include gear 526 and gear 528. In this illustrative example, gear 526 may be attached to motor system 508, while gear 528 may be attached to cylindrical structure 500.

In these illustrative examples, slide 520 and slide 522 may be attached to a frame or bulkhead (not shown) in vehicle body 404 to provide support for cylindrical structure 500. Further, linear actuator 512 and linear actuator 514 also may be attached to the same bulkhead and/or frame within vehicle body 404.

Cylindrical structure 500 may have solid section 530 and open section 532. In this illustrative example, solid section 530 may be located in opening 418 of vehicle body 404. In this configuration, cylindrical structure 500 of door 416 may prevent access to interior 534 of vehicle body 404 from exterior 536. In this example, weapons 538, 540, 542, 544, and 546 may be located within and/or moved into cylindrical structure 500.

Figure 6:
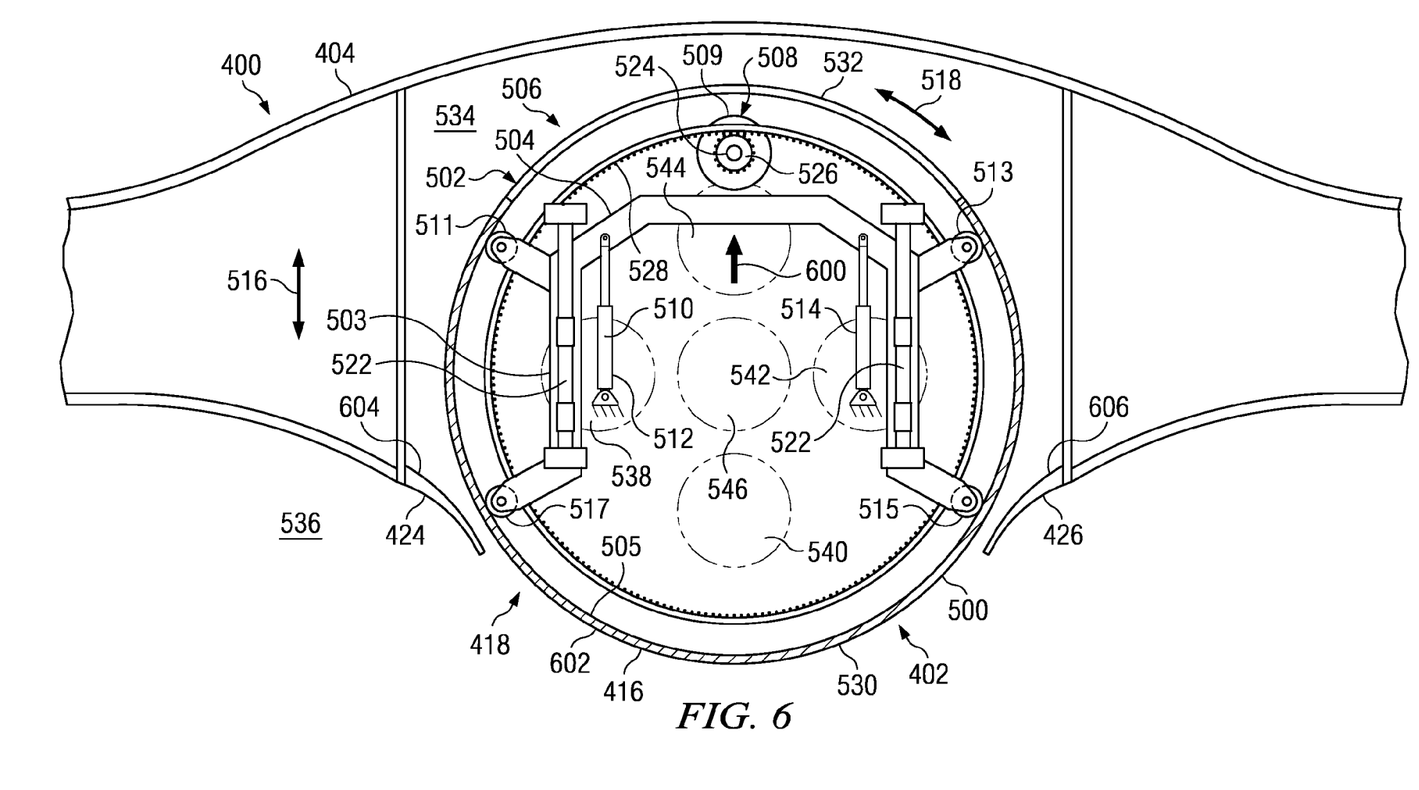
FIG. 6 is a diagram illustrating translation of a door in accordance with an advantageous embodiment.

With reference now to FIG. 6, a diagram illustrating translation of a door is depicted in accordance with an advantageous embodiment. As can be seen in this example, cylindrical structure 500 for door 416 may be translated by door translation system 510 in the direction of arrow 600.

As can be seen, cylindrical structure 500 may move in the direction of arrow 600 inward into interior 534 of vehicle body 404. This movement may cause surface 602 of cylindrical structure 500 to disengage from surfaces 604 and 606 of edge seals 424 and 426. In this manner, wear on edge seal 424 and 426 may be reduced when cylindrical structure 500 of door 416 is rotated.

Figure 7:
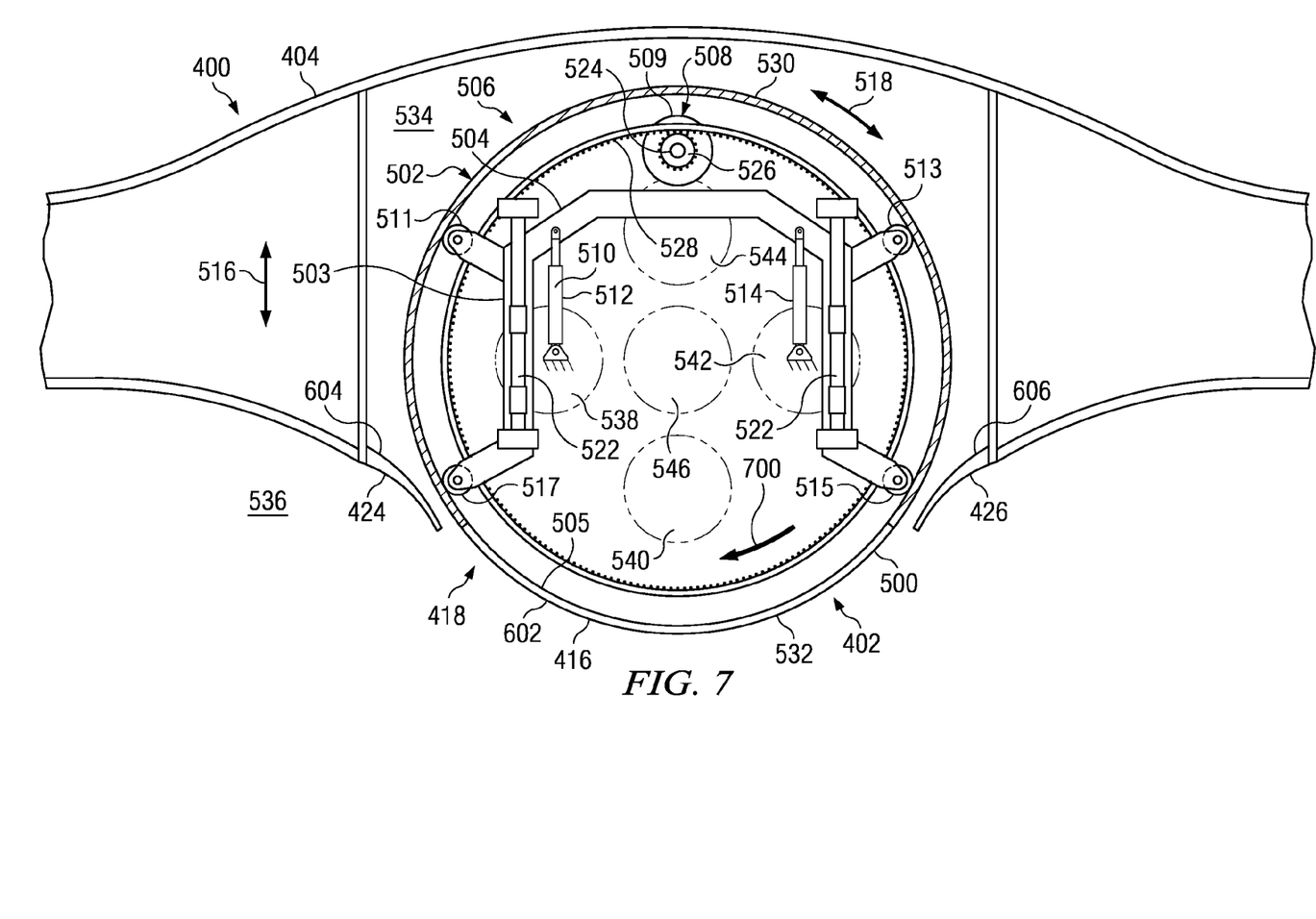
FIG. 7 is a diagram illustrating rotation of a door in accordance with an advantageous embodiment.

With reference now to FIG. 7, a diagram illustrating rotation of a door is depicted in accordance with an advantageous embodiment. In this example, cylindrical structure 500 of door 416 may be rotated in the direction of arrow 700, while surface 602 of cylindrical structure 500 for door 416 is not engaged with surface 604 and 606 of edge seals 424 and 426. The rotation moves open section 532 into alignment with opening 418. In these examples, weapons 538, 540, 542, 544, and 546 may be moved and/or rotated independently of cylindrical structure 500 while door 416 is rotated and/or open.

Figure 8:
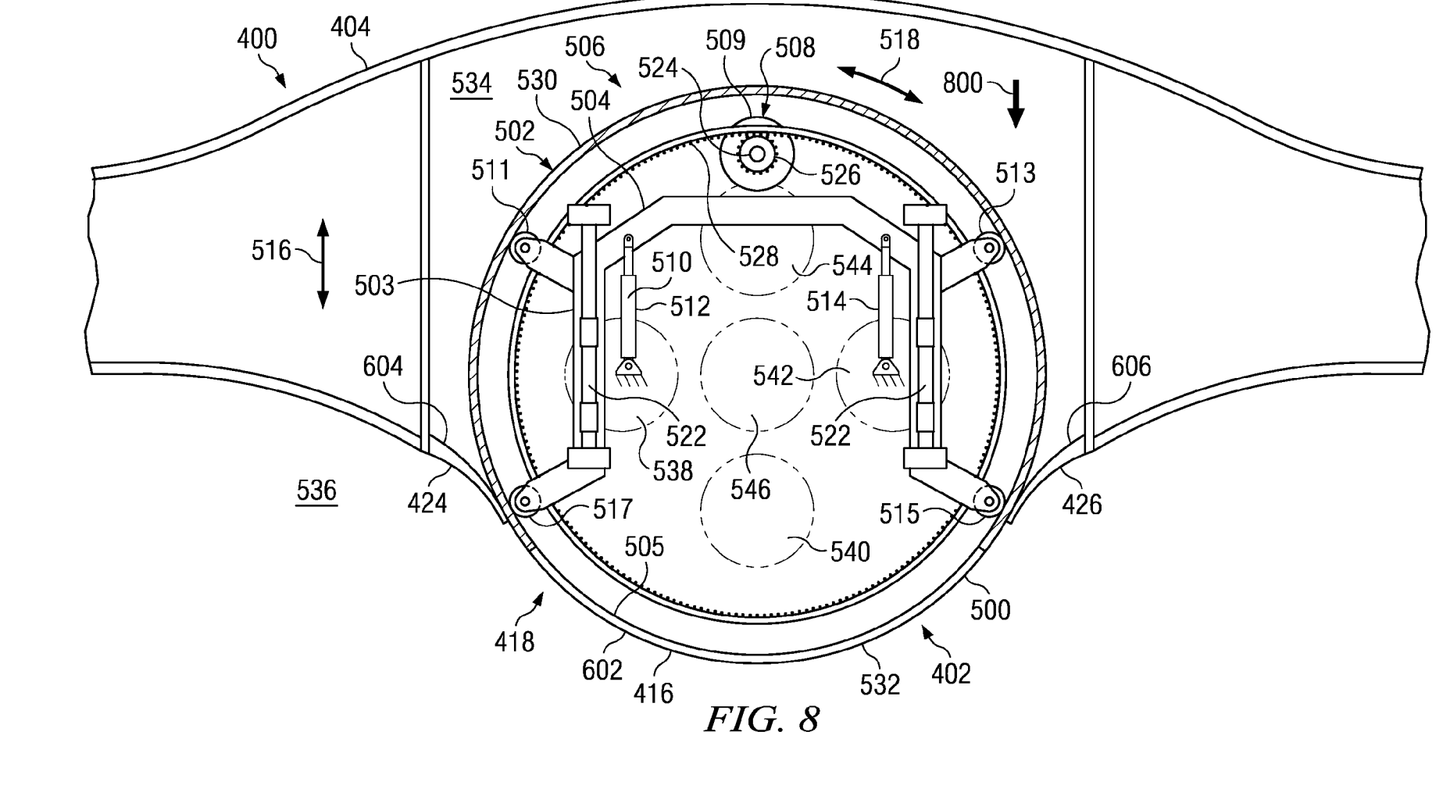
FIG. 8 is a diagram illustrating translation of a door in accordance with an advantageous embodiment.

With reference now to FIG. 8, a diagram illustrating translation of a door is depicted in accordance with an advantageous embodiment. In this illustrative example, cylindrical structure 500 for door 416 may be moved by door translation system 510 downward in the direction of arrow 800.

Surface 602 of cylindrical structure 500 for door 416 may engage surface 604 and surface 606 of edge seals 424 and 426. In this configuration, objects may be moved into and out of vehicle body 404 through opening 418 and open section 532. Moving cylindrical structure 500 for door 416 back to a closed position may be performed in a similar set of operations in reverse order from those illustrated in FIGS. 5-8.

Figure 9:
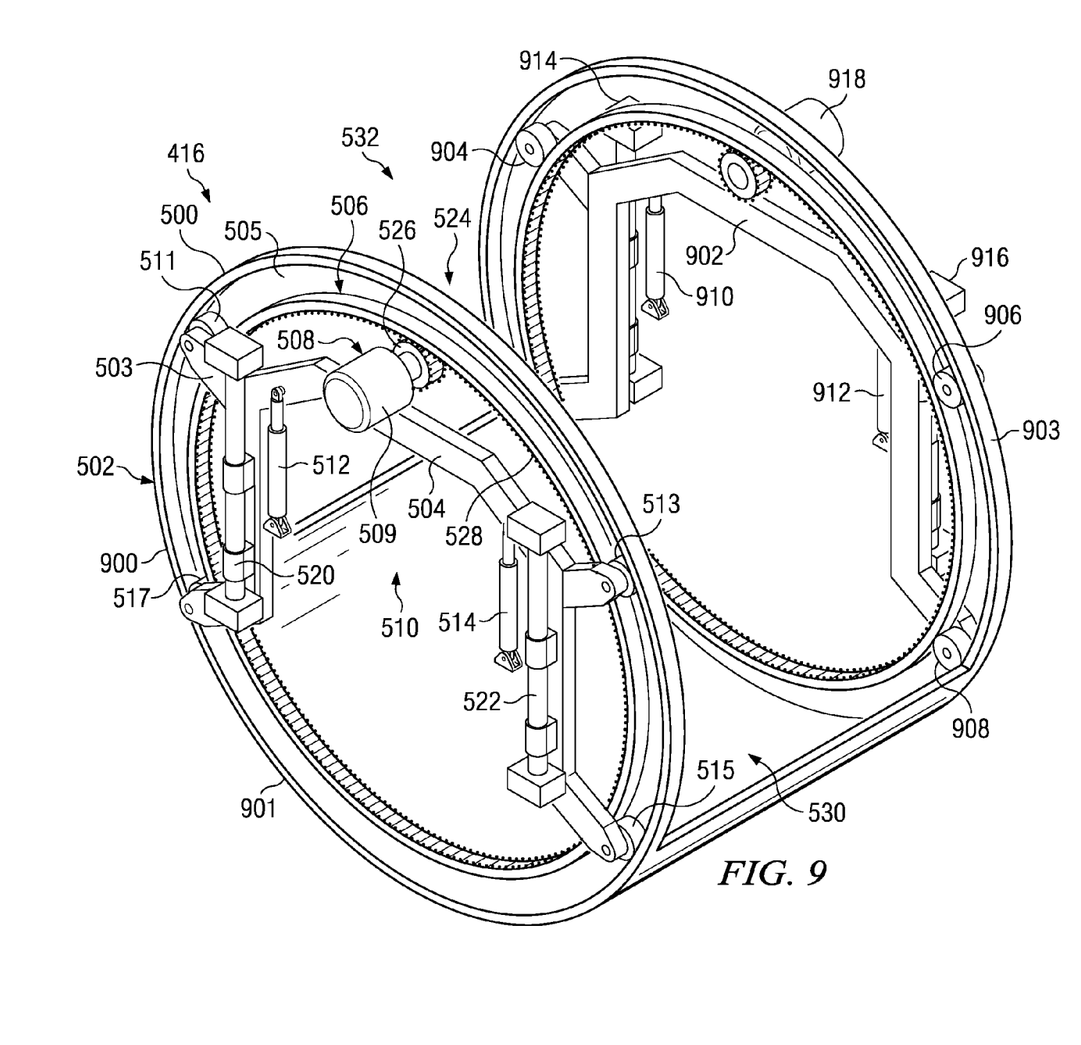
FIG. 9 is a diagram of a perspective view of a portion of a door environment in accordance with an advantageous embodiment.

With reference now to FIG. 9, a diagram of a perspective view of a portion of a door environment is depicted in accordance with an advantageous embodiment. In this view, end 901 and end 903 of cylindrical structure 500 for door 416 may be seen. In this example, the perspective view of cylindrical structure 500 also may have track 900 in track system 502. Track system 502 may be a structural component for cylindrical structure 500.

In this view, holding structure 902 also may be seen for frame 504. Wheels 904, 906, and 908 also may be seen on holding structure 902 and may be rotatably engaged with track 900. Door translation system 510 also may have linear actuators 910 and 912, as can be seen in this perspective view. In this illustrative example, holding structure 902 in frame 504 may be slidably attached to slides 914 and 916. Motor system 508 in door movement system 506 also may have motor 918, which may act in conjunction with motor 509 to rotatably move cylindrical structure 500 for door 416.

Linear actuators 512 and 514 may operate in conjunction with linear actuators 910 and 912 in door translation system 510.

Figure 10:
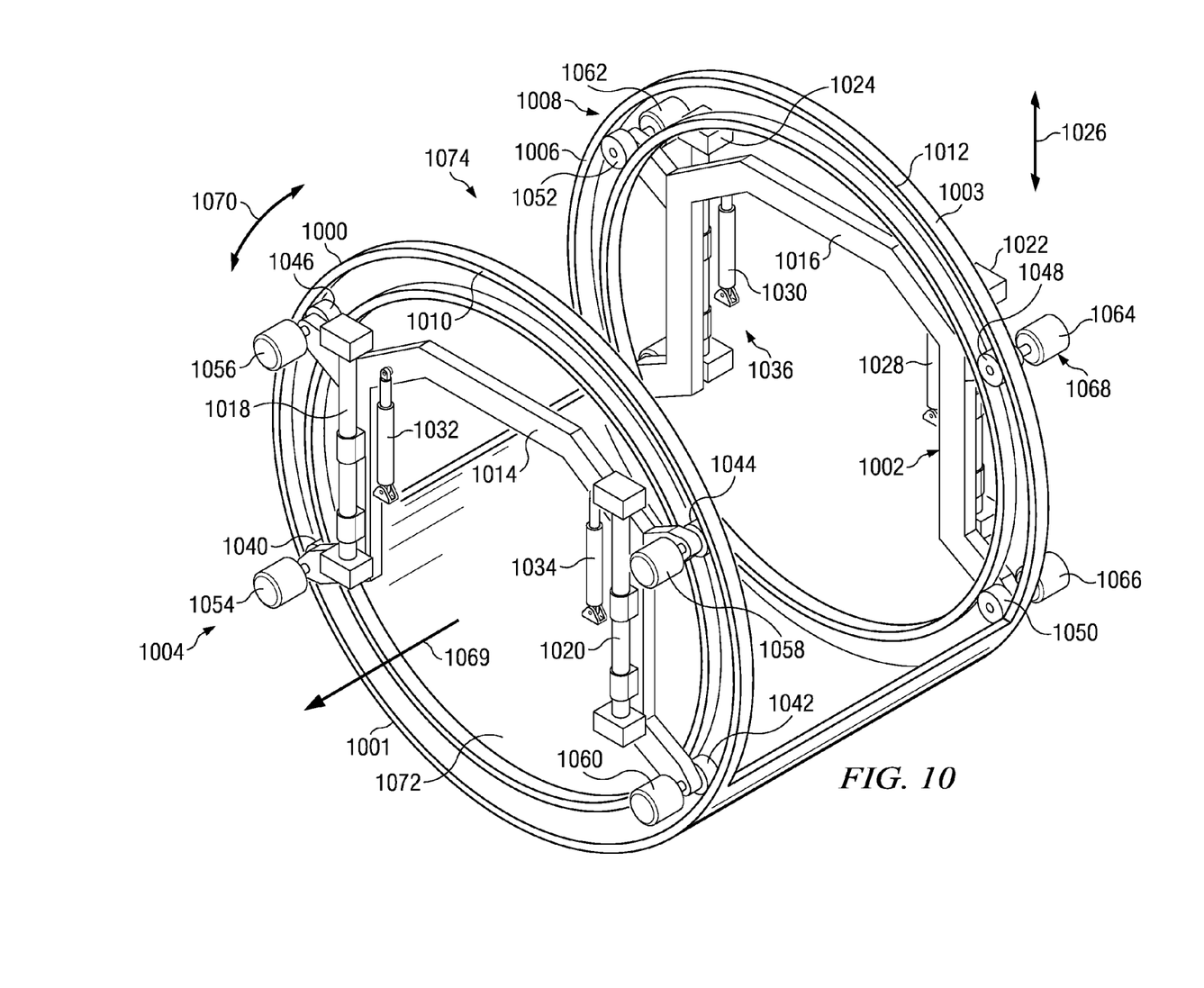
FIG. 10 is a diagram illustrating a perspective view of a door rotatably attached to a frame in accordance with an advantageous embodiment.

With reference now to FIG. 10, a diagram illustrating a perspective view of a door rotatably attached to a frame is depicted in accordance with an advantageous embodiment. Door 1000 may be an example of one implementation for door 304 in FIG. 3. In this example, door 1000 may have end 1001 and end 1003. Door 1000 may be moveably attached to frame 1002. Door 1000 may be rotated in frame 1002 by door movement system 1004.

In this illustrative example, door 1000 may comprise cylindrical structure 1006. Track system 1008 may be part of cylindrical structure 1006 and may include tracks 1010 and 1012. Frame 1002 may include holding unit 1014 and holding unit 1016. Holding unit 1014 and holding unit 1016 may be slidably attached to slides 1018, 1020, 1022, and 1024. These slides may allow cylindrical structure 1006 of door 1000 to move in the direction of arrow 1026 when holding units 1014 and 1016 of frame 1002 are biased or moved and/or moved by linear actuators 1028, 1030, 1032, and 1034 in door translation system 1036.

Track 1010 and track 1012 in track system 1008 for cylindrical structure 1006 of door 1000 may be moveably engaged with wheels 1040, 1042, 1044, 1046, 1048, 1050, and 1052 for holding unit 1014 and holding unit 1016. In these examples, motors 1054, 1056, 1058, 1060, 1062, 1064, and 1066 in motor system 1068 of door movement system 1004 may be attached to wheels 1040, 1042, 1044, 1046, 1048, 1050, and 1052.

In this manner, these motors may drive the wheels to rotatably move cylindrical structure 1006 of door 1000 around axis 1069 in the direction of arrows 1070. Axis 1069 may have other orientations other than a horizontal orientation. For example, axis 1069 may be vertical, or any other suitable orientation. Further, the translation of door 1000 by door translation system 1036 does not need to be perpendicular to axis 1069, as shown in this example. In this example, cylindrical structure 1006 of door 1000 may have solid section 1072 and open section 1074. Movement of cylindrical structure 1006 with solid section 1072 and open section 1074 may selectively provide access to an opening for a vehicle body (not shown).

Figure 11:
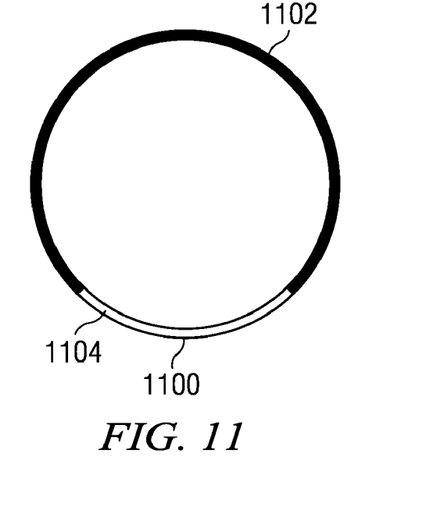
FIG. 11 is a diagram of a cross-sectional view of a door in accordance with an advantageous embodiment.

With reference now to FIG. 11, a diagram of a cross-sectional view of a door is depicted in accordance with an advantageous embodiment. In this example, door 1100 may have solid section 1102 and open section 1104. Of course, the configuration of solid and open sections may vary depending on the particular implementation.

Figure 12:
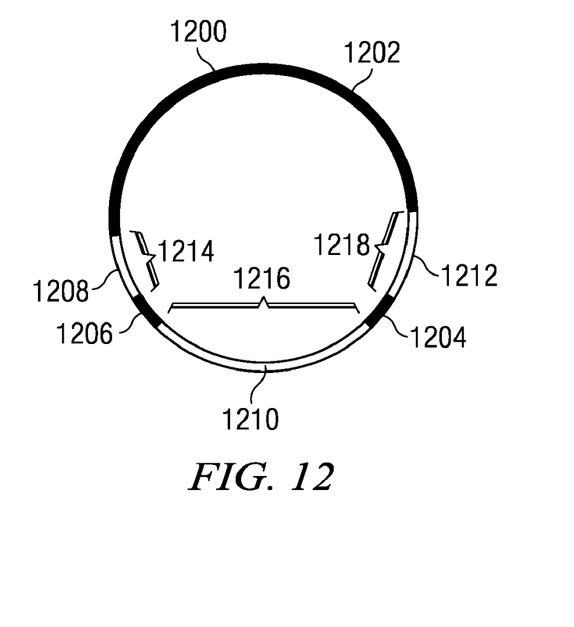
FIG. 12 is a diagram of a cross-sectional view of a door with multiple open sections in accordance with an advantageous embodiment.

In FIG. 12, a diagram of a cross-sectional view of a door with multiple open sections is depicted in accordance with an advantageous embodiment. In this example, door 1200 may have solid sections 1202, 1204, and 1206 with open sections 1208, 1210, and 1212. As can be seen in these examples, open sections 1208, 1210, and 1212 may have chords 1214, 1216, and 1218, respectively. These chords may have different lengths. The different lengths may provide different openings for door 1200. In this manner, the different sized openings may be selected based on the rotation of door 1200 to the appropriate open section.

Open section 1210 may provide access to interior 334, while vehicle body 310 is on the ground and may provide a largest opening for largest payload releases. Open section 1212 may provide in-flight access to release smaller payloads while reducing drag. Open section 1208 may be the smallest opening and may provide the least amount of increase in drag while providing payload release capabilities for smaller payloads.

Further, although an open and closed position may have been illustrated, the door in the different advantageous embodiments also may be rotated between additional positions with the different sections as illustrated for door 1200. For example, the positions also may include a position that may provide access to internal items. This position may be one that may reduce acoustic loads for different loads, such as weapons. An acoustic load is a noise level.

The illustrations of door environments in FIGS. 4-12 are provided for purposes of illustrating some implementations for door environment 300 in FIG. 3. These illustrations are not meant to imply physical or architectural limitations to the manner in which other door environments may be implemented. Other door environments may include other components in addition to or in place of the ones illustrated. Further, in some advantageous embodiments, some of the components illustrated may be unnecessary.

For example, fewer motors than the motors illustrated in motor system 1068 may be employed. Further, in other advantageous embodiments, other types of motor and gear systems may be employed other than those illustrated in these examples.

Figure 13:
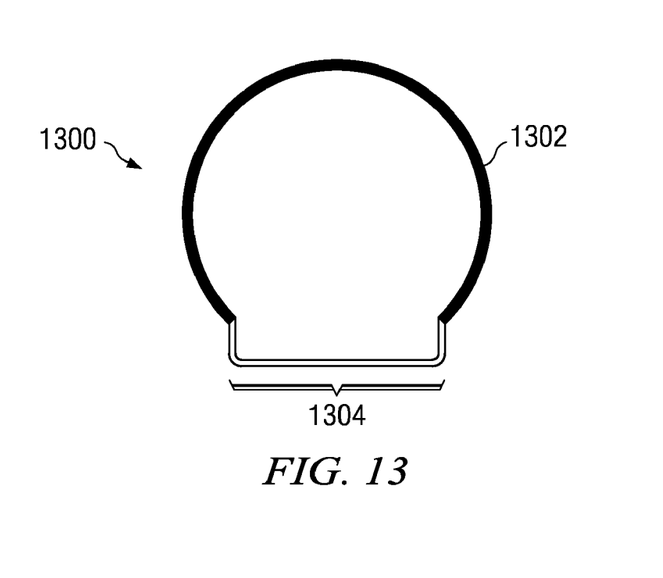
FIG. 13 is a diagram illustrating a track design in accordance with an advantageous embodiment.

With reference now to FIG. 13, a diagram illustrating a track design is depicted in accordance with an advantageous embodiment. Track 1300 is an example of a shape that may be used within track system 502 in FIG. 5. For example, track 1300 may be used in place of track 505 in FIG. 5.

Track 1300, in this illustrative example, has circular portion 1302 and elongated portion 1304. Elongated portion 1304 may control the motion of cylindrical structure 500 in FIG. 5. In other words, elongated section 1304 may function as door translation system 510 in FIG. 5 without requiring the components illustrated for door translation system 510 in FIG. 5.

Figure 14:
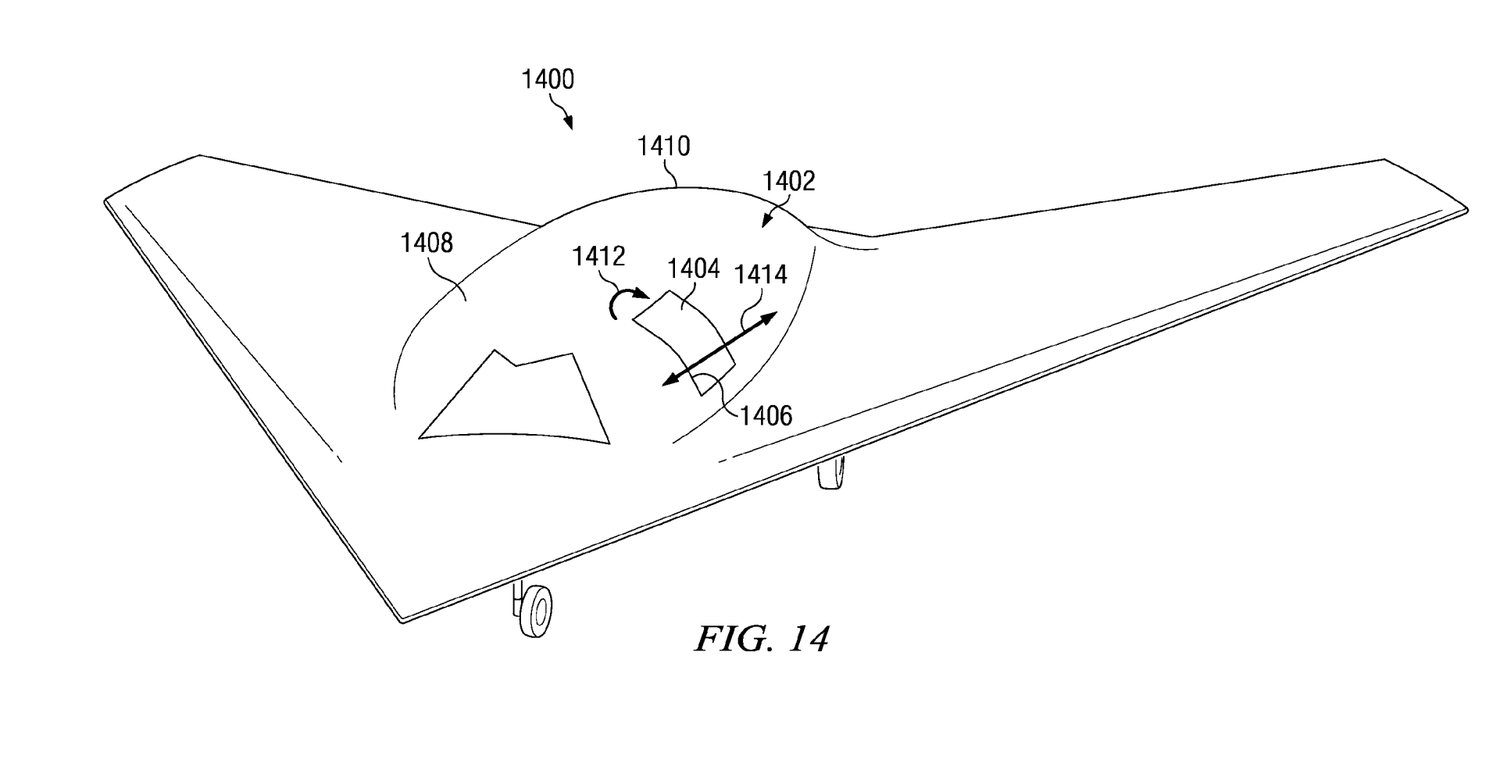
FIG. 14 is a diagram illustrating another implementation of a door environment in an aircraft in accordance with an advantageous embodiment.

With reference now to FIG. 14, a diagram illustrating another implementation of a door environment in an aircraft is depicted in accordance with an advantageous embodiment. In this example, aircraft 1400 may be an example of another implementation for aircraft 200 in FIG. 2. Aircraft 1400 may implement door environment 1402. In this illustrative example, door 1404 may cover opening 1406 in mold line 1408 of vehicle body 1410. In this example, door 1404 may be operated without having door 1404 moving outside of mold line 1408 of vehicle body 1410. Door 1404 may rotate in the direction of arrow 1412 and may translate in the direction of arrow 1414.

Figure 15:
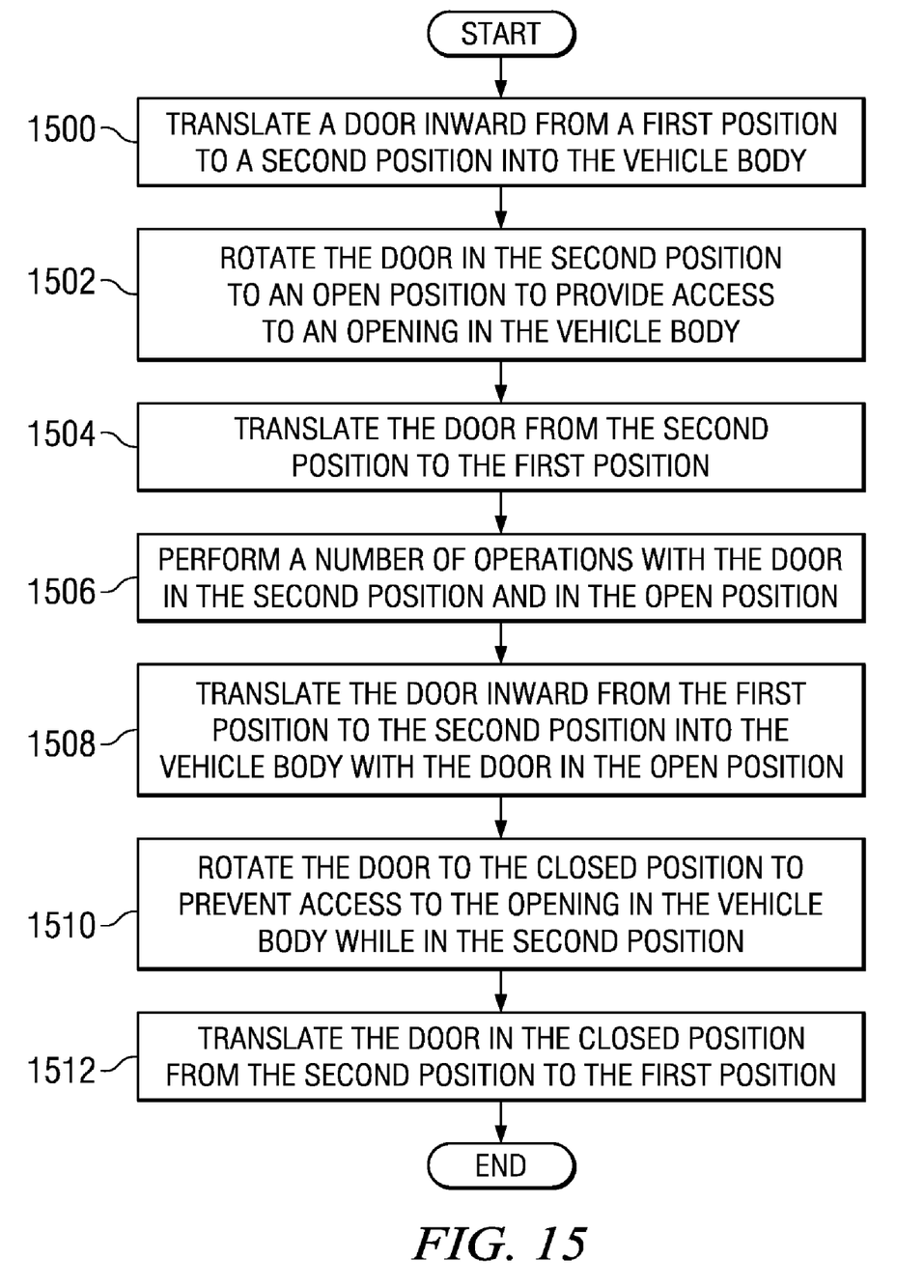
FIG. 15 is a flowchart of a process for moving a door between an open and closed position in accordance with an advantageous embodiment.

With reference now to FIG. 15, a flowchart of a process for moving a door between an open and closed position is depicted in accordance with an advantageous embodiment. The process illustrated in FIG. 15 may be implemented in a door environment such as, for example, without limitation, door environment 300 in FIG. 3.

The process may begin by translating door 304 inward from first position 327 to second position 329 into vehicle body 310 (operation 1500). In operation 1500, the door may be in a closed position. Door 304 may then be rotated in second position 329 to open position 314 to provide access to opening 308 in vehicle body 310 (operation 1502). The rotation of door 304 may be performed without moving door 304 outside of mold line 312 of vehicle body 310. Door 304 may be translated from second position 329 to first position 327 (operation 1504). A number of operations may be performed with door 304 in second position 329 and in open position 314 (operation 1506).

Door 304 may be translated inward from first position 327 to second position 329 into vehicle body 310 with door 304 in open position 314 (operation 1508). Door 304 may be rotated to closed position 316 to prevent access to opening 308 in vehicle body 310 while in second position 329 (operation 1510). Rotating of door 304 may be performed without moving door 304 outside of mold line 312 of vehicle body 310.

The process may then translate door 304 in closed position 316 from second position 329 to first position 327 (operation 1512), with the process terminating thereafter. In this position, door 304 may be in contact with edge seal 332 for opening 308.

The illustration of operations in FIG. 15 is not meant to imply limitations to the manner in which other processes using a door environment in accordance with an advantageous embodiment may be performed. In other processes, other operations may be used in addition to, or in place of, the ones illustrated. Further, in some cases, some operations may be unnecessary. In some advantageous embodiments, operations for other activities may not be performed after the door has been opened. In yet other advantageous embodiments, the opening of the door may be performed in conjunction with other steps, such as placing objects within a cylindrical structure for the door.

Thus, the different advantageous embodiments provide a method and apparatus for a door that may rotate and/or translate to provide access to an interior portion of an aircraft. The different advantageous embodiments may provide access without extending a door outside of the mold line for the aircraft. With the different advantageous embodiments, the door may be maintained flush to the mold line of a vehicle when in an open position.

As a result, high loading, flutter, fatigue, increased drag, shock generation during weapons release, increased radar cross sections, and other undesirable effects and/or characteristics may be prevented and/or avoided. Further, the different advantageous embodiments may provide for a capability to decrease the amount of weight of an aircraft because of the decreased complexity of the door environment in the different advantageous embodiments as compared to currently used door environments.

Another feature that may be provided by one or more of the different advantageous embodiments may be improved aerodynamic performance and/or aircraft handling if the door fails to close. Further, the different advantageous embodiments also may reduce wear on edge seals in the opening of the vehicle body. Also, with the different advantageous embodiments, the door environments may require less maintenance as compared to currently available door environments.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments in the illustrative examples are described with respect to an aircraft, one or more of the different advantageous embodiments may be applied to other vehicles other than aircraft such as, for example, without limitation, a submarine, a personnel carrier, a tank, a train, an automobile, a bus, a spacecraft, a surface ship, and other suitable vehicles.

As another example, the different advantageous embodiments may be applied to different types of doors for a vehicle. For example, without limitation, with an aircraft, the door environments in the different advantageous embodiments may be applied to doors for cargo bays, weapons bays, landing gear, auxiliary power unit exhaust, and other suitable areas. Other examples include rotating a mold line integrated feature, such as a sensor or an antenna, to expose the device to the exterior of the aircraft. Still other illustrative examples include mounting a deployable device, such as a boom or an attachment hook, to a door in accordance with an advantageous embodiment.

Although the different advantageous embodiments illustrate a cylindrical structure that may be partially or fully enclosed, the different advantageous embodiments may be applied for any surface of rotation. For example, without limitation, other structures for a door may include conical structures, elliptical structures, contoured mold line shapes for acceptable surfaces, and other suitable door shapes that may be rotated.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a frame configured for a translation into a vehicle body;
a door moveably connected to the frame by a first circular track system disposed at a first end of the door and a second circular track system disposed at a second end of the door, wherein the first circular track system and the second circular track system are configured to rotate about the frame from a closed position to an open position after the translation; and
a door movement system configured to translate the door inwardly from a first position to a second position into the vehicle body and to rotate the door in the second position to the open position to provide access to an opening in a mold line of the vehicle body without moving the door outside of the mold line of the vehicle body, wherein the mold line is an exterior surface of the vehicle body, wherein in the closed position the door closes the opening, and wherein in the open position the door allows an interior space of the vehicle body to be in communication with an exterior environment of the vehicle body through the opening.

2. The apparatus of claim 1, wherein the door movement system is capable of translating the door from the second position to the first position after the door has been moved to provide the opening.

3. The apparatus of claim 1, further comprising:
a motor capable of rotating the door.

4. The apparatus of claim 3, further comprising:
a gear system connected to the motor and the door, wherein the gear system is capable of rotating the door about the frame in response to operating the motor.

5. The apparatus of claim 3 further comprising:
a plurality of wheels attached to the frame, wherein the plurality of wheels engage the first track system and the second track system.

6. The apparatus of claim 5, wherein the motor is configured to rotate a wheel of the plurality of wheels to rotate the door between the open position and the closed position.

7. The apparatus of claim 1, wherein the frame is translated by a linear actuator system.

8. The apparatus of claim 1, wherein the vehicle body is for a vehicle selected from one of a mobile platform, an aircraft, a surface ship, a tank, a personnel carrier, a train, a spacecraft, a submarine, and a bus.

9. The apparatus of claim 1, wherein a number of seals are present around the opening, and wherein the door reduces a faying surface on the number of seals.

10. A door for an aircraft comprising:
an aircraft body having an opening in an exterior surface of the aircraft body for placing an interior space of the aircraft in communication with an exterior environment of the aircraft;
a frame attached to the aircraft body;
a door moveably connected to the frame by a first circular track affixed to a first end of the door and a second circular track affixed to a second end of the door, wherein the first circular track and the second circular track, are configured to rotate the door about the frame between a closed position and an open position without moving the door outside of the exterior surface of the aircraft body, wherein in the closed position the door closes the opening and in the open position allows an interior space of the aircraft body to be in communication with an exterior environment of the aircraft body through the opening;
a gear system connected to a motor; and
a linear actuator system configured to translate the frame into the aircraft body before the door is rotated from the closed position to the open position by the gear system.

11. A method for moving a door, the method comprising:
translating the door inward from a first position to a second position into a vehicle body;
rotating the door in the second position to an open position, by a first circular track affixed to a first end of the door and a second circular track affixed to a second end of the door, wherein the first circular track and the second circular track are configured to translate with a frame and to rotate the door about the frame, wherein rotating the door is performed without moving the door outside of a mold line of the vehicle body, wherein the mold line is an exterior surface of the vehicle, and wherein in a closed position the door completely closes an opening in the mold line and in the open position allows an interior space of the vehicle body to be in communication with an exterior environment of the vehicle body through the opening; and
translating the door from the second position to the first position.

12. A method for moving a door in an aircraft, the method comprising:
configuring a first circular track affixed to a first end of the door and a second circular track affixed to a second end of the door to translate with a frame moveably affixed to the door and to rotate the door about the frame;
translating the frame and the door inward from a first position to a second position into an aircraft body; and
responsive to translating the frame inward from the first position to the second position, rotating, by the first circular track and the second circular track, the door from a closed position to an open position to provide an opening in the aircraft body, wherein rotating the door is performed without moving the door outside of a mold line of the aircraft body, wherein the mold line is an exterior surface of the aircraft body, and wherein in the closed position the door seals and completely closes an opening in the mold line and in the open position allows an interior space of the aircraft body to be in communication with an exterior environment of the aircraft body through the opening.

* * * * *